US00RE41636E

(19) United States
(12) Reissued Patent
Fang

(10) Patent Number: US RE41,636 E
(45) Date of Reissued Patent: Sep. 7, 2010

(54) MODULARIZED LIGHT-GUIDING APPARATUS AND MANUFACTURING METHOD

(76) Inventor: Po-Hua Fang, 8F-2, No. 290, Gongyuan Rd., Hsin-chu City 300 (TW)

(21) Appl. No.: 11/796,694

(22) Filed: Apr. 27, 2007

Related U.S. Patent Documents

Reissue of:
(64) Patent No.: 6,619,807
Issued: Sep. 16, 2003
Appl. No.: 10/014,150
Filed: Dec. 7, 2001

U.S. Applications:
(

(62) Division of application No. 11/229,450, filed on Sep. 16, 2005.

(30) Foreign Application Priority Data

May 25, 2001 (TW) ..... 90112577 A

(51) Int. Cl.
*G02B 5/08* (2006.01)

(52) U.S. Cl. ..... 359/850; 359/857; 359/861

(58) Field of Classification Search ..... 359/627, 359/628, 850, 857, 861, 864, 726, 637; 355/57, 355/60, 66

See application file for complete search history.

(56) References Cited

U.S. PATENT DOCUMENTS

| | | | | | |
|---|---|---|---|---|---|
| 3,837,743 | A | * | 9/1974 | Amemiya | 355/60 |
| 3,905,681 | A | | 9/1975 | Nagel | |
| 5,220,463 | A | * | 6/1993 | Edelstein et al. | 359/857 |
| 6,104,497 | A | | 8/2000 | Cohen et al. | |
| 6,341,870 | B1 | * | 1/2002 | Koch et al. | 359/850 |
| 6,347,002 | B1 | * | 2/2002 | Hagelin et al. | 359/201 |
| 6,704,052 | B1 | | 3/2004 | Togino et al. | |
| 7,044,355 | B2 | | 5/2006 | Haraguchi | |

* cited by examiner

*Primary Examiner*—Timothy J Thompson
(74) *Attorney, Agent, or Firm*—Stolowitz Ford Cowger LLP

(57) ABSTRACT

A modularized light-guiding apparatus and manufacturing method, which may make the light of a light source proceed at least twice light reflections of predetermined directions. The light-guiding apparatus includes a plurality of modularized reflection elements, which may be differentiated to several different types of reflection element. Each type of each reflection element all has substantially same adjoining device and edge size for providing to be adjoined and piled-up with another reflection element. But, the reflection element of different type individually has different number of reflection plane for providing the light to proceed different times of light reflection. It may determined the light reflection times and light-path length for the light-guiding apparatus, by choosing several different types of reflection element among plural reflection elements to proceed the piling-up for the light-guiding apparatus.

23 Claims, 8 Drawing Sheets

MODULARIZED LIGHT-GUIDING APPARATUS AND MANUFACTURING METHOD

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,619,807. The reissue applications are application Ser. No. 11/796,694 (the present divisional reissue application), and Ser. No. 11/229,450, all of which are reissues of U.S. Pat. No. 6,619,807.*

FIELD OF THE INVENTION

The present invention relates to a modularized light-guiding apparatus and manufacturing method, especially to a kind adapted for use in a light-guiding apparatus for an optical scanning apparatus, and to proceed modularization and design for the reflection elements in the light-guiding apparatus to facilitate manufacture and assembly, and to be able to transform out modularized light-guiding apparatus with different light-path lengths, and the corresponding manufacturing method.

BACKGROUND OF THE INVENTION

Please refer to FIG. 1, which shows an embodiment for a typical flat bed optical scanner 1 seen in current market. Mainly, a document window glass is arranged on an upper side surface of the outer shell 11 of a scanner 1 to place a scanned document (not shown). An optical chassis 14, driven by a driving apparatus 13, proceeds a linear motion along the direction of a guiding rod 15 inside a hollow outer shell 11 to proceed an image-scanning job for the document on the glass 12.

Please refer to FIG. 2, which is an A—A sectional view for the optical chassis 14 of a prior optical scanner 1 in FIG. 1. The optical chassis 14 includes: a hollow shell body 141, a right source 142, which is positioned at an appropriate position on the upper side plane of the shell body 141, a light-guiding apparatus, which is assembled by plural reflection mirrors 143, a lens set 144, and a charge-coupled device 145. The light source 142 emits a light to the document (not shown), and its reflection light enters into the interior of the shell body 141 of the optical chassis 14 and is reflected by the plural reflection mirrors 143 in the light-guiding apparatus to lengthen its optical length to an appropriate length. Afterwards, the reflected light is focused by the lens set 144 and formed into an image on the charge-coupled device 145, by which the scanned image data is converted into electronic signals.

Please refer to FIG. 1 and FIG. 2, which show the prior optical chassis 14. Because the reflection mirror 143 is constructed by plating silver on a thin-plate-typed glass that is unable to be directly piled-up and positioned by itself, [so] additional spring pieces 146, *a* fixture mechanism, or *a* method of matching screw locking are needed to fix the reflection mirror 143 at predetermined position inside the shell body 141. [Not only the] *The* positioning elements of additional spring pieces 146 and fixture mechanism [would] directly cause [the] *an* increase of parts number and production cost and raise the assembly time and manpower cost.[, but also] *Additionally, even* if plenty [number] of assembly parts [is] existed, then the occupying volume [is caused to increase] *must be increased*, and [it is unavoidable to happen the situation that] the parts [loose] *may loosen* or *create* uneven holding strength [would cause] *causing* position bias for the reflection mirror 143 and [lower down] *decrease* the quality of image scanning. Furthermore, [because] *the spring pieces 146 would reduce its holding force due to* the elasticity fatigue of the spring pieces 146 caused by long-period use [would reduce its holding force] or [under] *caused by* the vibration [situations happened] *experienced* during machine transportation[.]. *Likewise,* the prior art[s] that employ*s* the spring pieces 145 as fixture mechanism for holding the reflection mirror 143 may also [occur] *experience* the situations of loose*ning* or position bias in the reflection mirror 143 and cause the quality [lowering-down] *decrease* in image scanning [and that is needed to be improved].

Furthermore, there is still one big shortcoming in the light-guiding apparatus of the prior optical chassis 14 shown in FIG. 1 and FIG. 2; namely, since each piece of reflection mirror has only one reflection plane to proceed single reflection for the light[, and] in order to reach the total track (abbreviated as TT value, which is the total value of Y1+Y2 . . .+Y5 as shown in FIG. 2) needed by the lens set 144 to focus image clearly, [so] the distance between each reflection mirror 143 is needed to *be* elongate*d* (i.e. *an* increase *in* the values of Y2 and Y3), or the light is reflected twice on one reflection mirror, or *an* additional number of reflection [mirror is] *mirrors are* needed to increase [for increasing] the times of reflection. However, the elongation of distance between each reflection mirror 143 would directly cause the enlargement of the total volume of the optical chassis 14. Twice reflections proceeded on one single mirror would cause the area increase for the reflection mirror or raise the complexity on the designs of light-path routes. And, the increase of the number of reflection mirrors would then cause the [raise for] *increase* both difficult*y* and cost in element assembly and mirror position*ing* for the optical chassis 14. All these arrangements are not the perfect solution methods.

Additionally, for all the *optical chassis* light-guiding apparatus [in the optical chassis] seen in current market*s*, [its] *the* reflection mirror 143 all [is reflection mirror] *are* of thin-plate-shaped glass, [neither each] *no* reflection mirror 143 is *of* modularized design, nor can *it* be inter-piled-up or positioned, while additional design*s* for positioning devices [is] *are* needed to position the inter-angles and distances between each reflection mirrors 143. Not only *would* any errors on any position angle [would] cause [the lowering-down] *a decrease* of scanning quality, but also for the needs of different resolution, different outer sizes of optical chassis, different scanning paper sizes (the sizes of A3 or A4), or other needs for different light-path routes or total track of optical chassis, a set of position device is designed from the beginning to change the inter-position between each reflection mirror 143, and the usage is very inefficient.

SUMMARY OF THE INVENTION

The first object of the present invention is to provide a modularized light-guiding apparatus and manufacturing method, which include several reflection elements in modularized design, wherein at least one reflection element has two reflection planes and may provide at least twice reflection for light to increase the length of light-path route provided by a single reflection element, thereby a [less] *lower* number of reflection element in a narrow space of *a* light-guiding apparatus would generate *a* relatively larger light-path length.

The second object of the present invention is to provide a modularized light-guiding apparatus and manufacturing method, which include several reflection elements in modularized design. Each reflection element all is a single element formed to one body, and has different numbers of reflection plane to provide different values of light-path length. Under the condition of no change in the outer volume and size of the light-path apparatus, it is possible to reach the function of changing total track of the light-path apparatus by choosing the reflection elements with different numbers of reflection plane*s* for connection and assembly to [fulfil] *fulfill* the needs [for] *of* optical chassis having different total tracks, and it is completely unnecessary to design a new optical chassis from the beginning.

The third object of the present invention is to provide a modularized light-guiding apparatus and manufacturing method, which include several reflection elements in modularized design. Each reflection [all] *elements* is a single element formed to one body and has substantially same edge size and adjoining plane. Further, it is sufficient to complete the position for the inter-angles and distances between each reflection element to become a light-guiding apparatus, simply by inter-butting and inter-piling-up the adjacent planes between each reflection element. [Even] *Accordingly*, no additional position mechanism is needed to proceed the position between each reflection elements. However, the present invention may also fix each reflection element to avoid its loose*ning* by applying additional position*ing* means.

Preferably, by arranging a position plate individually at two end sides of the reflection elements, and arranging inter-setting-in convex points and concave holes at predetermined positions at two end sides of the position plate and each reflection element, and last by setting-in both convex point and concave hole to make the reflection element position and connect at the predetermined position on the position plate, [it can be reached] the position and fixation for plural reflection elements *can be reached*.

Preferably, no matter how many numbers of reflection planes are possessed by the reflection device, the directions and positions for light entering into and emitting away the reflection elements are all the same.

For your esteemed review committee to further understand and recognize the present invention, a detailed description in company with matching drawings are present as following.

DETAILED DESCRIPTION OF THE PREFERRED EMBODIMENT

The modularized light-guiding apparatus 20 of the present invention[, which] provides plural modularized reflection element 21, 22, 23 that can be differentiated to several groups with different types. Each [type's each] reflection element 21, 22, 23 *type* all [has] *have* substantially *the* same adjoining mechanism and edge size for [providing to be] *being* adjoined and piled-up with another reflection element. But, the reflection element*s* 21, 22, 23 of different type individually [has] *have* different number*s* of reflection plane*s* 211, 221, 231 for providing the light to proceed several times of light reflection. [It can be decided the] *The* reflection times and light-path lengths of the light-guiding apparatus 20[.] *can be decided* by choosing several different types of reflection element*s* among the plural reflection element*s* 21, 22, 23 to proceed piling-up the light-guiding apparatus 20.

Several preferable embodiments are proposed as following to describe the detailed structure, motion manner, function, and other characteristics of the modularized light-guiding apparatus of the present invention in detail.

Figure 3A:
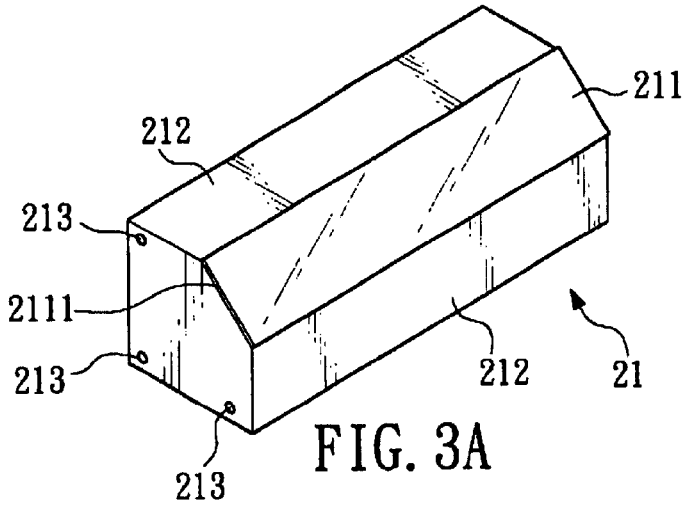
FIGS. 3A, 3B, and 3C are the embodiments individually for the reflection elements with several different types in the modularized light-guiding apparatus of the present invention.
Figure 3B:
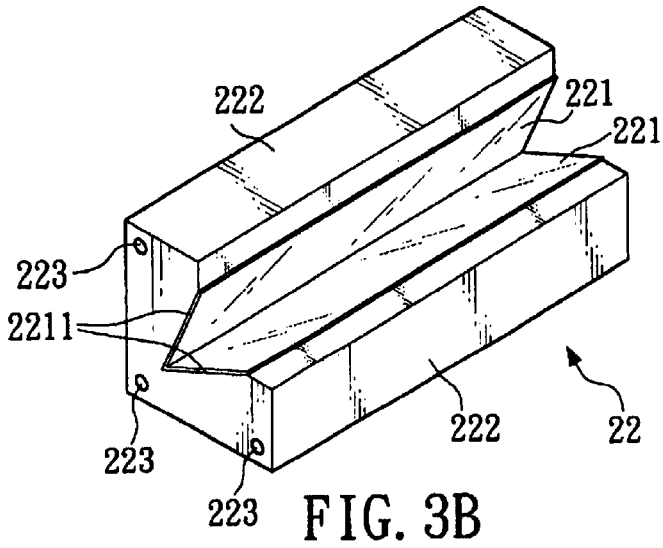
Figure 3C:
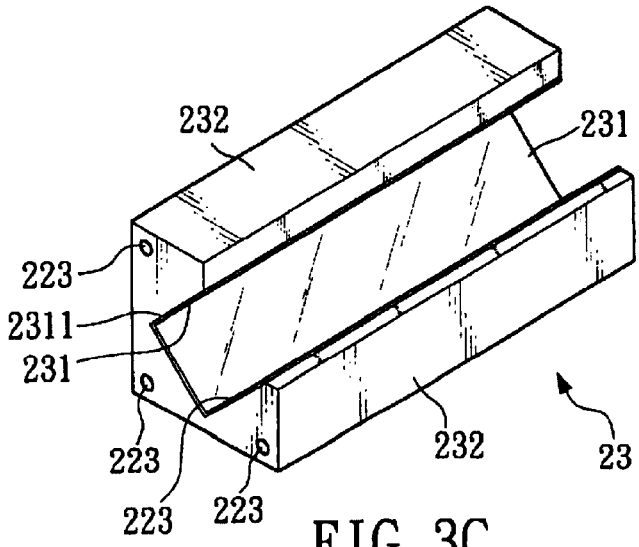
Figure 4A:
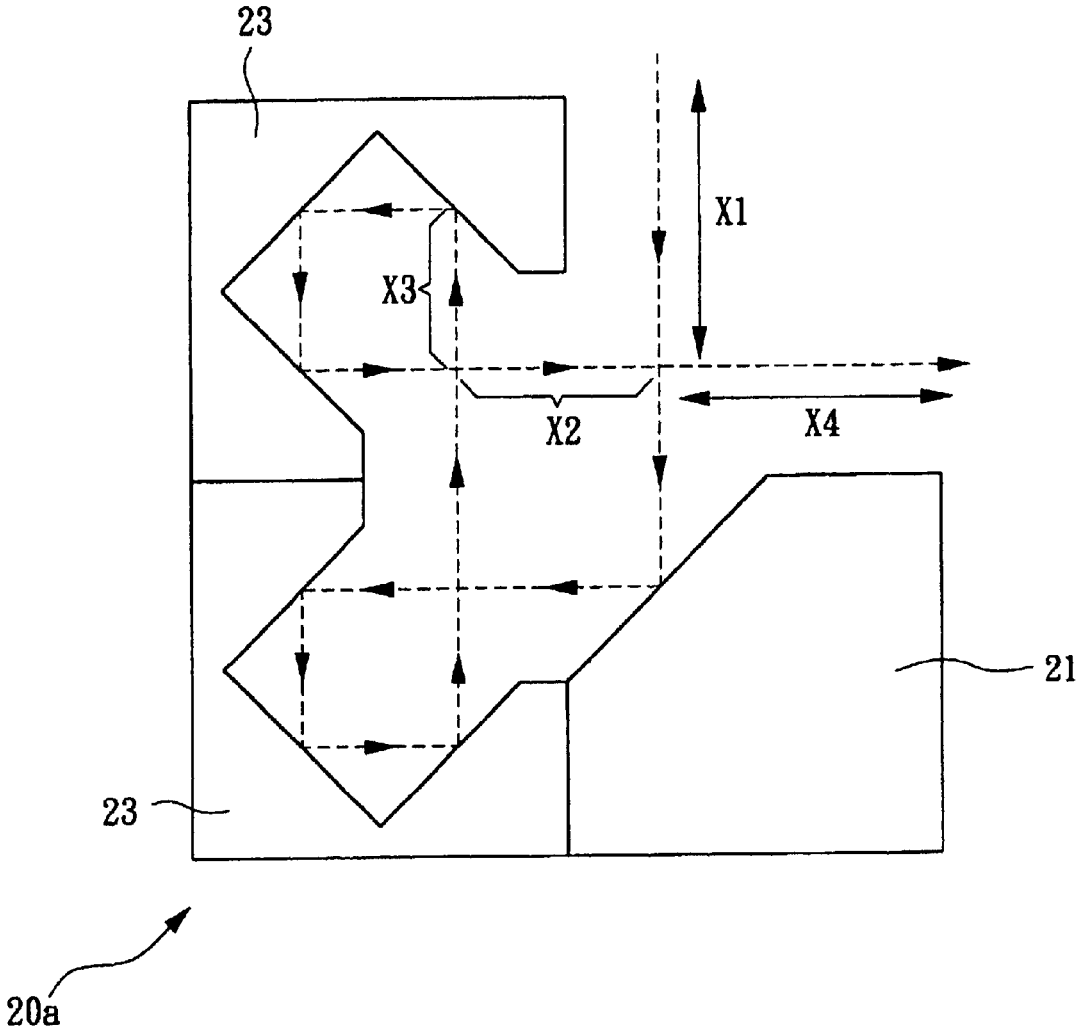
FIGS. 4A, 4B, and 4C are several the embodiments individually for the modularized light-guiding apparatus of the present invention applying same number but different types' reflection elements to assemble and generate different light-path lengths.
Figure 4B:
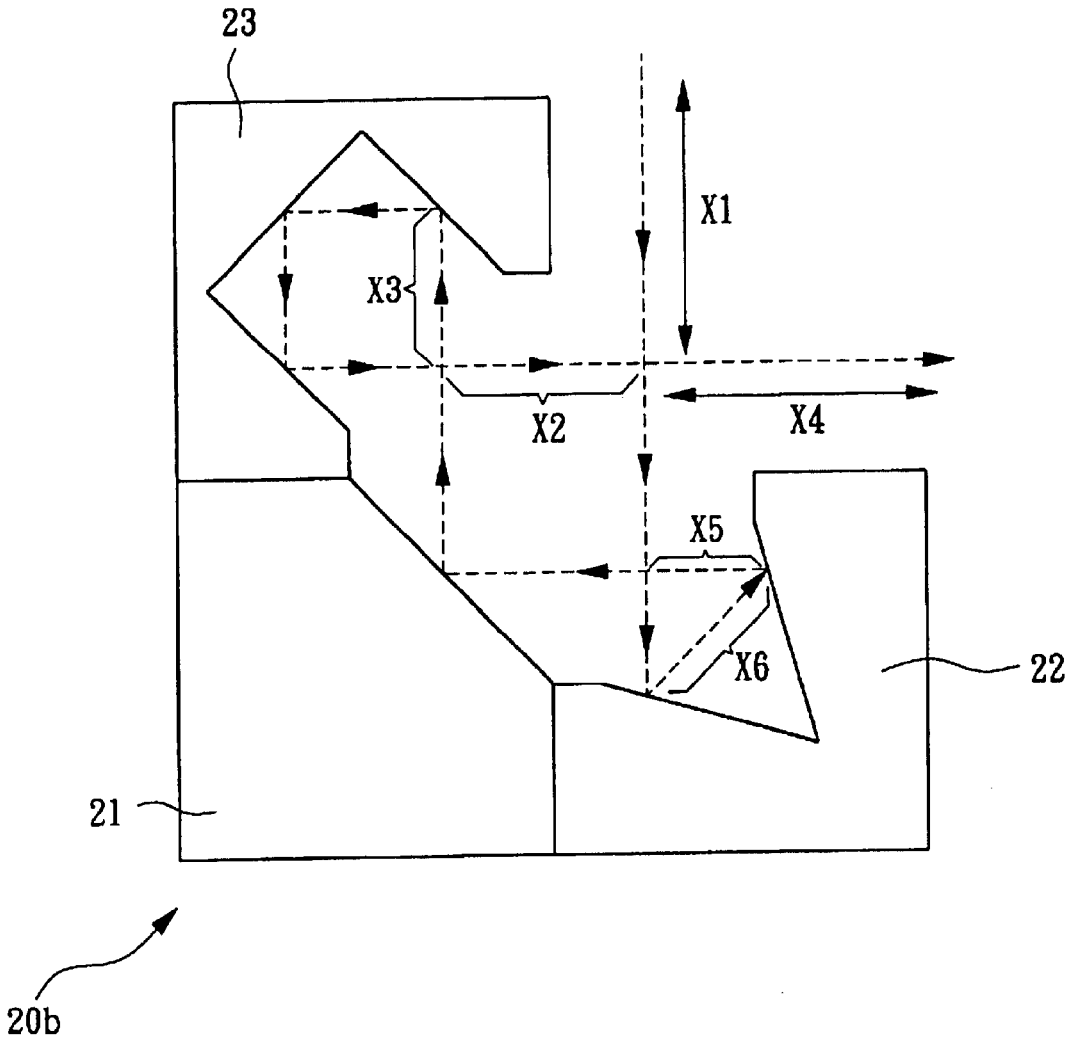

Please refer to FIGS. 3A, 3B, 3C and FIGS. 4A, 4B, 4C, which show the several preferable embodiments for the modularized light-guiding apparatus 20 of the present invention. FIGS. 3A, 3B, and 3C are the embodiments individually for the reflection element 21, 22, 23 with several different types in the modularized light-guiding apparatus 20 of the present invention. FIGS. 4A, 4B, and 40 are several embodiments individually for the modularized light-guiding apparatus 20 of the present invention applying same number but different types[']  *of* reflection element 21, 22, 23 to assemble and generate different light-path lengths.

As shown in these drawings, each reflection element 21, 22, 23 [all is the] *comprise a* modularized element with shape of *a* long, narrow block; namely, each reflection element 21, 22, 23 [all has] *have* substantially [save] *the same* edge size (i.e. same length, width and altitude) and can be randomly chosen to inter-pile-up the light-guiding apparatus, which is called as a modularized element by the manner similar to [blocks] building *blocks*. In this preferable embodiment, the reflection element*s* 21, 22, 23 [all is] *are each* preferably a single element formed to one body, of which materials may be glass, crystal, quartz, and transparent acrylic-plastic sheet, etc., or which may also be made of opaque or semi-transparent materials of metal, ceramic, plastic, opaque acrylic-plastic sheet, wood, and paper, etc.

As shown in FIGS. 3A, 3B, 3C, at least a narrow, long reflection plane 211, 221, 231 [are] *is* individually arranged on the reflection element 21, 22, 23 along a narrow direction, and several adjoining plane*s* 212, 222, 232 are also arranged on the reflection element 21, 22, 23, and several positioning concave hole*s* 213, 223, 233 are arranged at the predetermined positions on the two end side surfaces positioned at the narrow, long reflection element 21, 22, 23. By forming a cutting portion along a narrow, long direction on the narrow, long reflection element 21, 22, 23, the [said] reflection plane*s* 211, 221, 231 are formed into slant planes or cutting planes concaved inward with predetermined angle on the reflection element 21, 22, 23. Then at least one layer of plating film 2111, 2211, 2311 of the light-reflection materials are covered on these planes to form the reflection plane 211, 221, 231 that may proceed the light reflection. In this preferable embodiment, the plating film 2111, 2211, 2311 of light-reflection materials can be formed by directly plating materials with excellent light-reflection such as chromium or silver etc. on the reflection plane 211, 221, 231, or *by* directly adhering the light-reflection plating film 2111, 2211, 231 onto the reflection planes with the same manner as adhering an adherent paper. Or, when the reflection element 21, 22, 23 is made of materials with excellent light-reflection (i.e. partly metals etc.), by polishing the portion of the reflection plane 211, 221, 231, a good effect of light-reflection may also be reached without needing plating film. As shown in FIG. 3A, [which is the] reflection element 21 *may* only [having] *have* a single reflection plane 211 (abbreviated for type A). FIG. 3B shows the reflection element 22 having two reflection planes 221 (abbreviated for type B). [While] FIG. C shows the reflection element 23 having three reflection planes 231 (abbreviated for type C). Although these reflection element*s* 21, 22, 23 of different types [having] *have* different numbers of reflection plane*s* 211, 221, 231 to proceed light reflection of different times and provide different lengths of light reflection (light-path length), [but,] in this preferable embodiment, no matter what kinds of reflection element 21, 22, 23 all [has] *have* the same characteristics as following:

(1) Having substantially *the* same profile edge size (i.e., same length, width, altitude), and substantially *the* same structure of position*ing* concave holes. There are only different structures of concaved portions for the different numbers of reflection plane 211, 221, 223, due to cutting formation among each different type[s] of reflection clement 21, 22, 23.

(2) Having substantially *the* same size and providing adjoining plane*s* 212, 222, 232 capable of inter-matching with adjoining plane*s* 212, 222, 232 of another reflection element 21, 22, 23 (independent of any type[s]) to inter-close-together *for assembly* and inter-position for proceeding piling-up *to align the reflection element 21, 22, 23.*

(3) Independent of any type or reflection element 21, 22, 23 having any numbers of reflection plane, the directions and positions for light entering into or reflecting from each reflection element 21, 22, 23 are all the same, and after emitting to a reflection element 21, 22, 23 with predetermined direction, first, the light all will be reflected at least once on each reflection plane 211, 221, 231, then again emitting out from the reflection element 21, 22, 23 with another predetermined direction.

(4) When several reflection element*s* 21, 22, 23 (independent of any type) are interbutting, adjoining and piling up by using the adjoining plane 212, 222, 223, a predetermined direction for light emitting from a reflection element is just corresponding to the predetermined direction for light entering into another adjacent reflection element, and the guidance and transfer of light may be proceeded completely with predetermined directions.

Figure 4C:
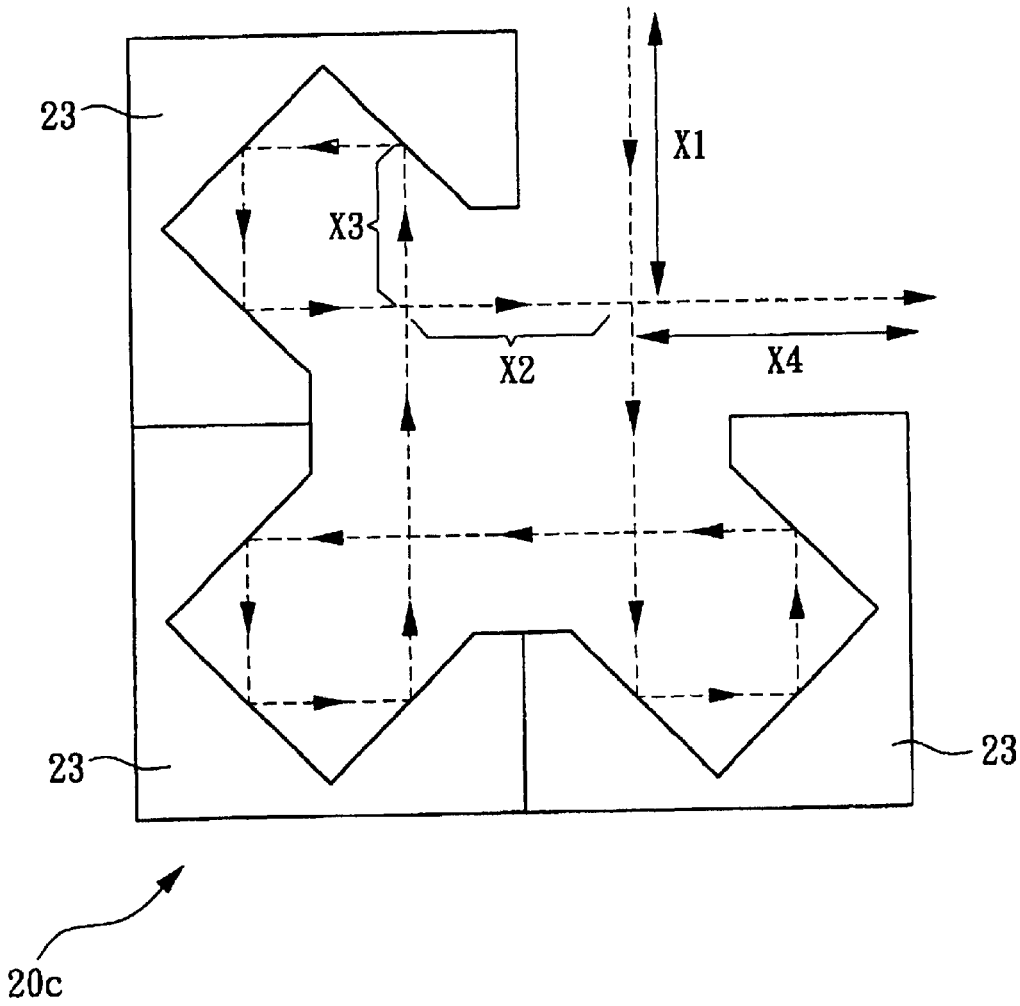

[As shown] *Shown* in FIGS. 4A, 4B, 4C[, which] are several kinds of embodiment*s* that apply the light-guiding apparatus 20a, 20b, 20c constructed by the reflection element 21, 22, 23 as shown in FIGS. 3A, 3B, 3C. These embodiments concretely describe that the present invention, by choosing different number of reflection element 21, 22, 23 or reflection element 21, 22, 23 with different numbers of reflection plane, may adjoin the modularized light-guiding apparatus 20a, 20b, 20c and decide the reflection times and light-path lengths for the light that may be provided by the modularized light-guiding apparatus. In order to describe the implementation effect of the present invention in simple way, only three reflection element 21, 22, 23 are adopted to pile up and construct the light-guiding apparatus 20a, 20b, 20c in FIGS. 4A, 4B, 4C, however it is intended to emphasize that the employable variations for the present invention are absolutely not restricted to the embodiments as shown in FIGS. 4A, 4B, 4C.

[As shown] *Shown* in FIG. 4A[, which] is a light-guiding apparatus 20a, constructed by using the reflection element 21 of type A and the reflection element 23 of type C, and of which the substantial light reflection number is seven times, and the length of total track is "X1+4*X2+8*X3+X4".

FIG. 4B shows a light-guiding apparatus 20b, constructed by using the reflection elements of one type A (reflection element 21), one type B (reflection element 22) and one type C (reflection element 23), and of which the substantial light reflection number is six times, and the length of total track is "X1+4*X2+4*X3+2*X5+X6+X4".

FIG. 4C shows a light-guiding apparatus 20c, constructed by using the reflection element 23 of three type C, and of which the substantial light reflection number is nine times, and the length of total track is "X1+4*X2+12*X3+X4".

Figure 1:
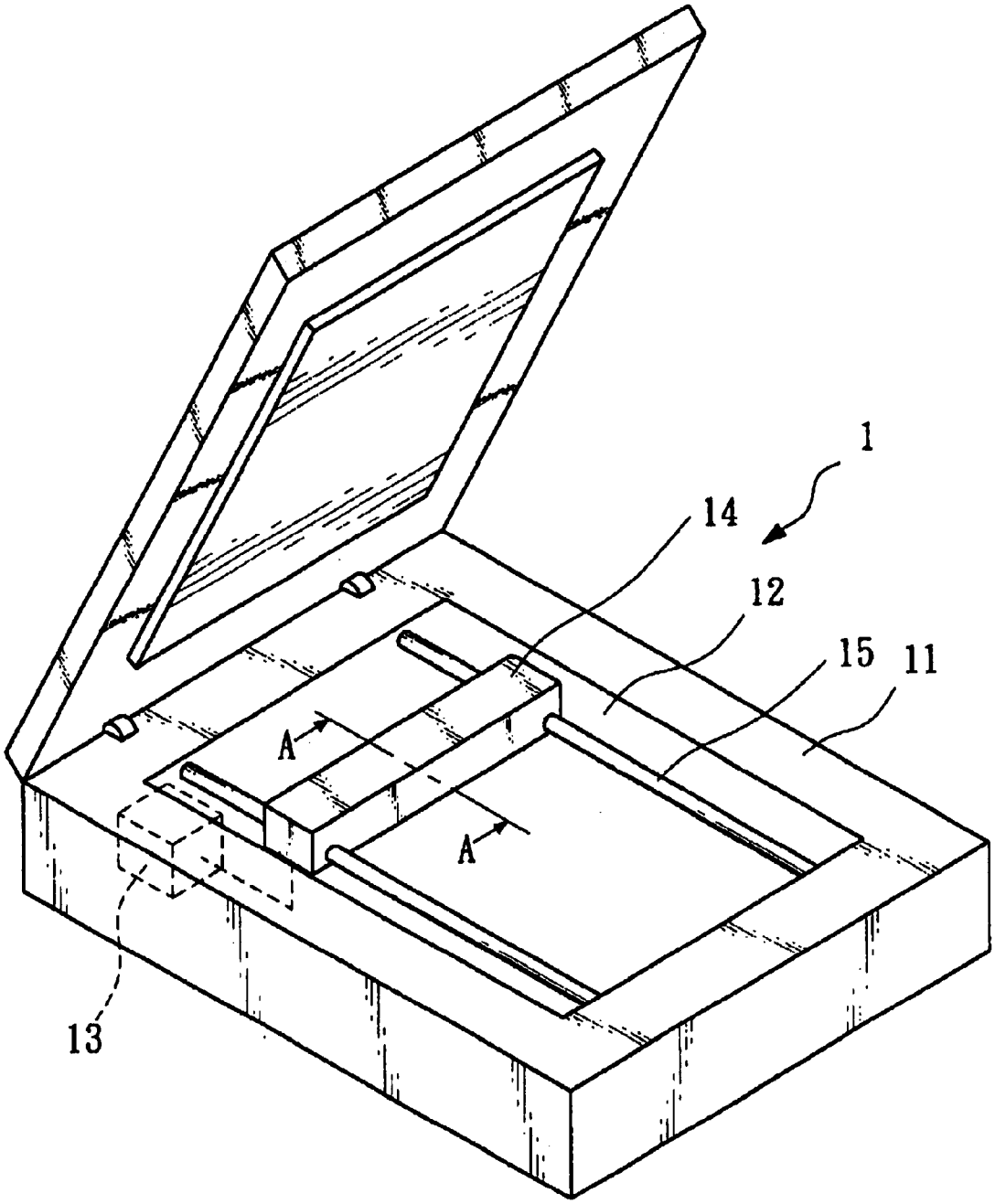
FIG. 1 (PRIOR ART)
FIG. 1 is an illustration for the optical scanner of prior art.
Figure 2:
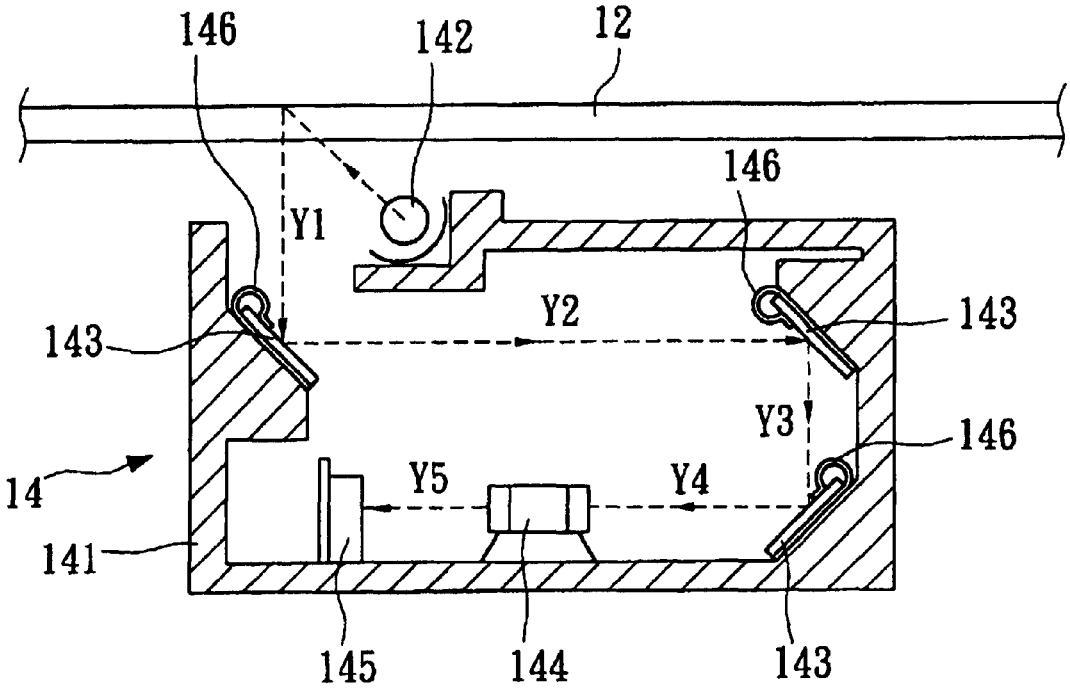
FIG. 2 (PRIOR ART)
FIG. 2 is an illustration for the light-guiding apparatus inside the optical chassis of a prior optical scanner.

One thing is worth mentioning: [for any person who is well-known] the light-path apparatus and for an optical chassis, the distance X1 prior to light entering the light-guiding apparatus 20 and the distance X4 (may refer to FIG. 6) between the light-guiding apparatus and the lens set 31 are not relatively easy to be changed (i.e., when comparing FIG. 4A with FIG. 2, wherein X1=Y1, X4=Y4). Namely, we can easily find that the value of light-path length of the prior light-guiding apparatus as shown in FIG. 2 can only be changed mainly by determining the magnitude of distances of Y2 and Y3 between each reflection mirrors 143. As the values of Y2 and Y3 are enlarged in order to increase the total track, then the total volume of entire optical chassis or light-guiding apparatus is also caused to increase greatly. However, relatively, the refection element 21, 22, 23 of the present, designed by modularization, can easily assembly out the light-guiding apparatus 20a, 20b, 20c having plenty different values of total track, by only choosing and using different types of reflection element 21, 22, 23 for matching and piling-up. When we design that X2 is equal to X3, for the light-guiding apparatus constructed by three same reflection element 21, 22, 23, the provided minimum total track (equal to 4*X2, when using three reflection elements 21 of type A) is one-forth for the provided maximum total track (equal to 16*X2, when using three reflection elements 23 of type C), however, the outer profile and volume size of the guiding apparatus are then always kept consistent, and these are the techniques that can not be reached by the all prior light-guiding techniques.

From above-description, we know that the manufacturing method of the modularized light-guiding apparatus 20 of the present invention should include following steps:

(1) Preparing plural reflection element 21, 22, 23, which may be differentiate to the reflection element 21, 22, and 23 of several different types. The reflection element 21, 22, 23 of each different type individually have different numbers of reflection planes 211, 221, 231 for providing light to proceed light-reflection of different times and light-path lengths.

(2) According to the needed values of light-path length for the intended-manufacturing light-guiding apparatus, the needed types and numbers of reflection elements are calculated out to reach the values of the light-path length; and (3) The light-guiding apparatus is assembled and connected according to the calculation for the needed reflection elements.

In the present invention, [since] each reflection element 21, 22, 23 [all has] *have* substantially *the* same profile edge size[,] and adjoining plane 212, 222, 232 capable of inter-matching, and which may be provided with adjoining planes of another reflection elements (independent of any types) for inter-closing-together and positioning to proceed piling-up. Therefore, only by inter-closing-together [for] adjoining plane 212, 222, 232 between each reflection element 21, 22, 23, it is sufficient to reach the inter-position between each reflection element 21, 22, 23, and facilitate the reflection plane 211, 221, 231 of each reflection element 21, 22, 23 to be able to correspond with the reflection planes of another reflection element to proceed the light-reflections in predetermined directions. It is unnecessary to arrange additional holding elements such as spring pieces 146 etc. as used in prior art, or design additional slant planes with predetermined angles and positions inside the prior shell body 141 to provide support for the position reflection mirrors 143. However, in order to make each reflection element 21, 22, 23 of the light-guiding apparatus 20 of the present invention be able to be connected and fixed firmly without loosing off, in one preferable embodiment of the present invention, the plural reflection element 21, 22, 23 can be made to be positioned, fixed and connected to one body without being able to separate from each other, by applying an additional positioning means.

In one of the preferable embodiments for the positioning means, the adjacent adjoining plane 212, 222, 232 for each adjacent reflection element 21, 22, 23 [are] *is* directly adhered and connected by glue, thermal-melting-glue, ultrasonic-wave melting connection, thermal melting connection, or welding (adapted for metal materials) to reach the position and fixture between the plural reflection element 21, 22, 23.

In another preferable embodiment for the positioning means (not shown in the drawings), the structure of positioning concave holes are similarly arranged on the two side surfaces of the adjacent planes of each reflection element, and are inserted onto the adjacent planes of two adjacent reflection elements [by] *in* the manner of [tennon] *a tenon*. In another further preferable embodiment for the positioning means (not shown in the drawings), the gliding troughs (or guiding troughs) and the structure of flanges both capable of inter-setting-in are arranged on the adjacent planes of each reflection element for proceeding assembly and fixture. Because the positioning means described in this section is a well-known technique for prior positioning mechanism to inter-set-in two elements, repetitious descriptions are not presented here.

Figure 5:
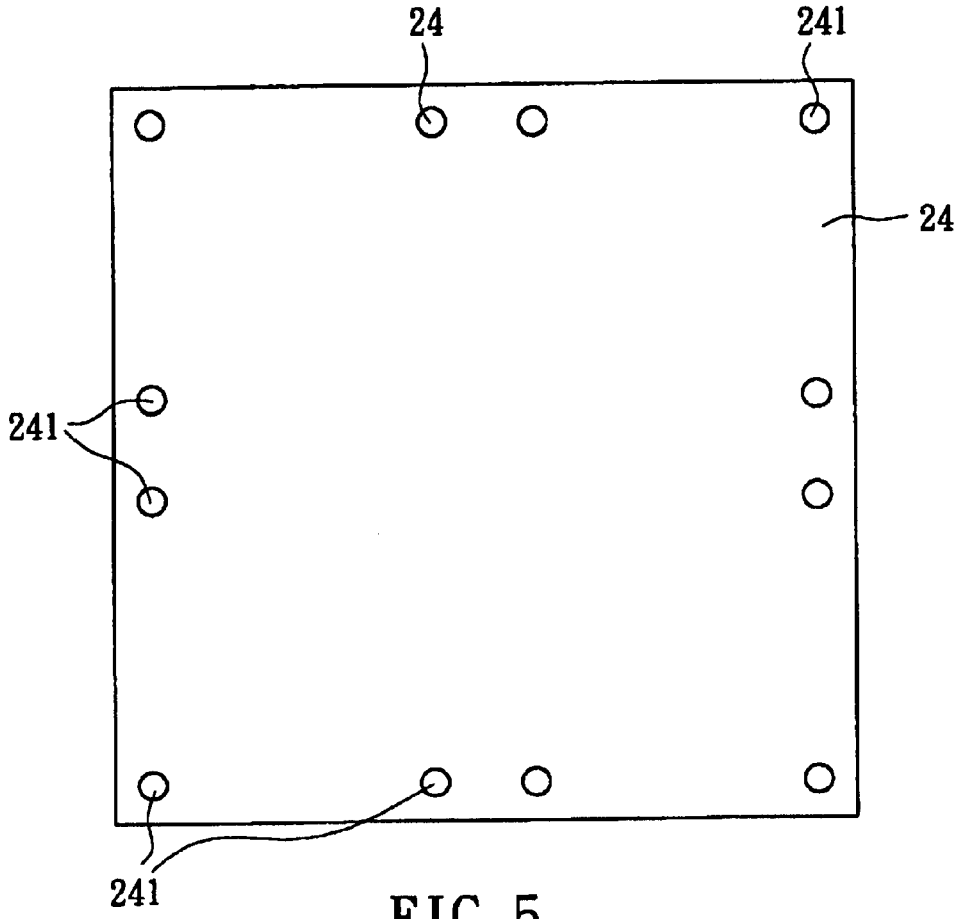
FIG. 5 is a position plate embodiment for the modularized light-guiding apparatus of the present invention.

Please refer to FIG. 5, which is another further embodiment of positioning means for the reflection element 21, 22, and 23, of the light-guiding apparatus 20 of the present invention. The positioning means (positioning mechanism) further reaches the position and fixture for plural reflection element 21, 22, 23, by arranging a positioning plate 24 individually on each two end sides of the reflection element 21, 22, 23, and arranging several positioning convex points 241 on the positioning plate to be able to be inter-set-in with the positioning concave hole 213, 223, 23 of each reflection element 21, 22, 23, and by the inter-setting-in for the convex points 241 and the concave point 213, 223, 233 to make the reflection element 21, 22, 23 be able to be positioned and connected at some predetermined position on the positioning plate 24. For example, as shown in FIG. 5, [which is] the structure of the positioning plate 24 [that then] may be used to individually fix and connect three reflection element 21, 22, 23 (independent of any type) shown in FIGS. 4A, 4B, 4C to the upper-left, lower-left, and lower-right corner portions of the positioning plate 24, *respectively*.

Figure 6:
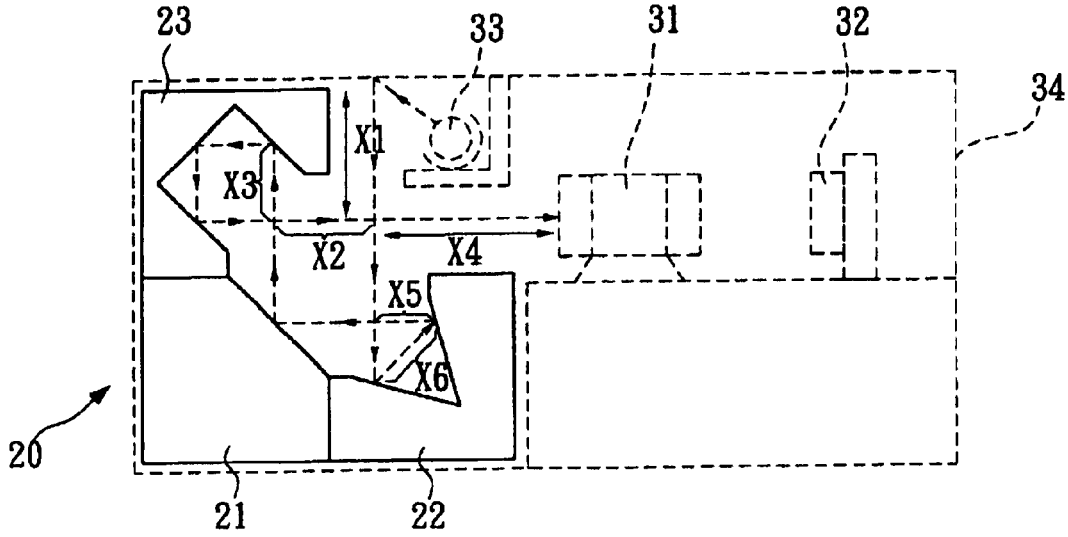
FIG. 6 is an embodiment illustration for the modularized light-guiding apparatus of the present invention installed inside an optical chassis of an optical scanning apparatus.

Please refer to FIG. 6, [which is] the light-guiding apparatus 20 of the present invention [that] is matched with the elements of lens set 31, charge-coupled device 32, light source 33, and optical chassis shell body 34, etc. to assemble and construct an optical chassis that is adapted for using on an optical scanning apparatus. From FIG. 6, we know that the light-guiding apparatus 20 of the present invention may directly provide the effect of light-reflection in predetermined directions and light-path length, by simply only inter-piling-up and positioning the reflection element 21, 22, 23 with each other, wherein the optical chassis is essentially unnecessary to be additionally arranged with another positioning devices or holding elements on or inside its shell body 34, and these arrangements may greatly improve the harassment from the prior art. *In use with an optical scanning apparatus, the light-guiding apparatus 20 may transmit light from light source 22, may receive the transmitted light through an opening in a light-guiding apparatus 20, may reflect the received light within the light-guiding apparatus 20 (at least three times for example), may release the reflected light through the opening in the light-guiding apparatus 20, and may transmit the released light to a lens set 31. Additionally or alternatively, the light transmitted from the light source 22 to the lens set 31 may be reflected only within the light-guiding apparatus.*

Figure 7:
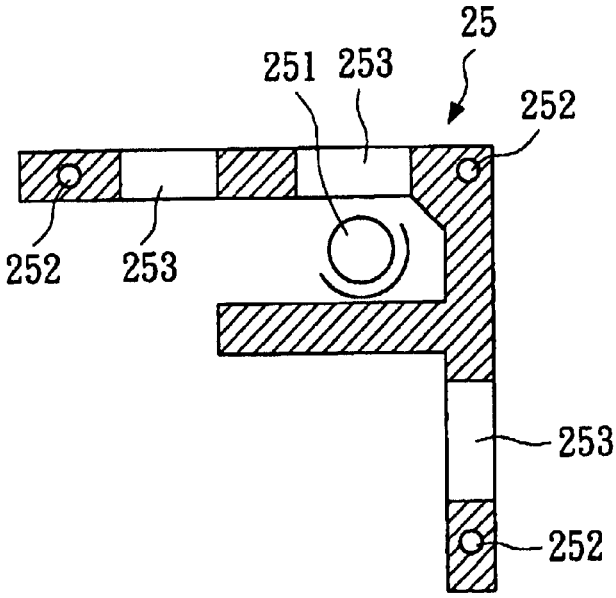
FIG. 7 is another embodiment for the modularized light-guiding apparatus of the present invention, which describes a light-source element having light-source with modularized element and being able to match the usage of inter-piling-up of reflection elements.

Please refer to FIG. 7, which is another preferable embodiment for the modularized light-guiding apparatus of the present invention. In this preferable embodiment, the light source element 33 of the optical chassis may also be designed as a modularized light source element 25 having the substantially same structures of profile edge sizes (length, width, and altitude) and positioning concave holes, etc. as those in the reflection element 21, 22, 23 of the present invention or the modularized light source element 25 may also have the substantially same structures of adjoining plane as those in the reflection element 21, 22, 23. On the predetermined positions of the modularized light source element 25, there are arranged with a light source 251, positioning concave holes 252, and several narrow, long opening [trough] *troughs* 253 to provide the passing-through for the light. With this embodiment, the modularized light source element 25 may directly proceed the piling-up and positioning with each reflection element 21, 22, 23, or be assembled to the upper-left corner portion of the positioning plate 24 as shown in FIG. 5 by the positioning concave holes 252, and to be able to facilitate the assembly and manufacture for the optical chassis.

Figure 8:
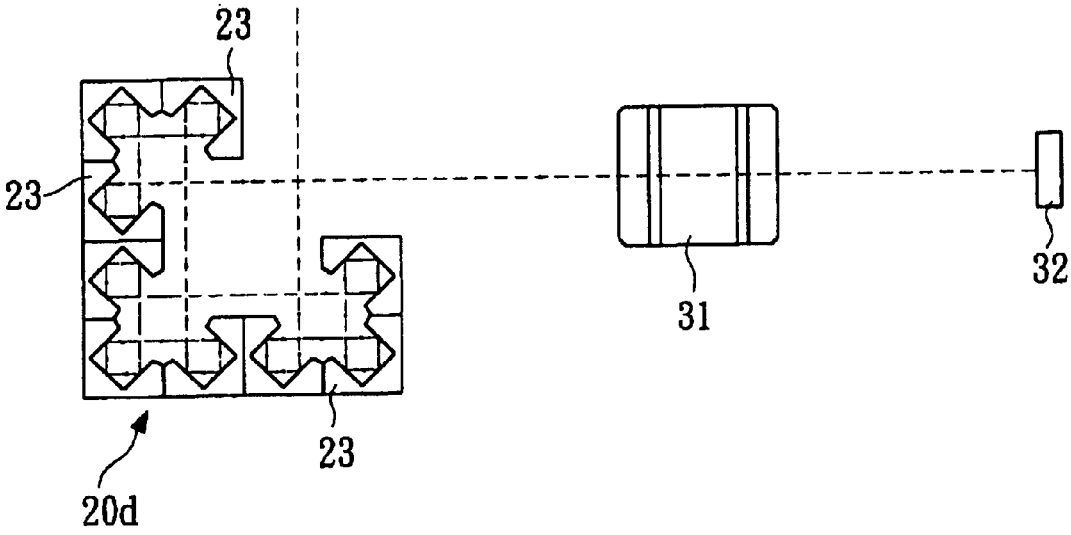
FIG. 8 is another embodiment for the modularized light-guiding apparatus of the present invention, which illustrates a light-guiding apparatus piled-up by using nine reflection elements.

As shown in FIG. 8, [which is] another further embodiment of the present invention *is illustrated*, wherein the light-guiding apparatus 20d is comprised of nine reflection elements 23 of type C, and its total reflection number is 27 times.

Above-mentioned embodiments are applied to describe the present invention in detail, and are not the restricted scopes of the present invention. For example, the reflection elements of the present invention are not only restrained to the reflection element 21, 22, 23 with rectangular long stripe shape as shown in FIGS. 3A, 3B, 3C, nor are the present invention restrained to having the number of reflection plane no more than three. Relatively, the reflection element of the present invention may also be designed as the reflection element with similar shapes of pentagon or other multi-side long stripe, and the number of the reflection plane of the reflection elements may also larger than three, or even the reflection plane is an arc plane. Furthermore, the modularized light-guiding apparatus of the present invention are not restricted to be used on the optical chassis of an optical scanning apparatus and can also be adapted for being used in another optical chassis of other optical machines such coping machine etc. that need to proceed the light reflection for reaching the predetermined distance. Again, for example, the reflection elements of the present invention are not restricted to above-mentioned embodiments, wherein each *of the* reflection plane*s* [all] only proceeds [once] *a single* light-reflection, relatively[,]*;* the reflection element may also be designed to proceed several times of light-reflection on *the* same reflection plane[,]*;* or under certain circumstance, some reflection plane [is] *may* not *be* able to reflect the light. Therefore, for all the people who are familiar with this kind of technique should understand that any appropriately little change or adjustments of the present invention are still not departed from the merits, spirits, and scopes thereof.

What is claimed is:

[1. A modularized light-guiding apparatus, which may make the light of a light source proceed at least twice light-reflection of predetermined direction, the modularized light-guiding apparatus includes:

plural reflection elements, each reflection element individually has at least one reflection plane provided to proceed reflection for the light, and each reflection element individually has at least one adjoining plane provided for being adjoined with another reflection element, and only by simple inter-adjoining for the adjoining planes of each reflection element, it is sufficient to reach the inter-position between each reflection element, and facilitate the reflection planes of each reflection element be able to be corresponded with the reflection planes of another reflection element to proceed the light-reflection of predetermined direction.]

[2. The modularized light-guiding apparatus as the claim 1, wherein, each reflection element all is the modularized element of narrow, long stripe shape, namely, each reflection element all has substantially same edge size and can be inter-piled-up to become the light-guiding apparatus.]

[3. The modularized light-guiding apparatus as the claim 1, wherein, in the plural reflection elements, at least one reflection element has at least two reflection planes, and the light of predetermined direction, emitting to the reflection element, can be proceeded more than twice light-reflection by at least two reflection planes, and then the light emits away the reflection element with predetermined direction.]

[4. The modularized light-guiding apparatus as the claim 1, wherein, in the plural reflection elements, at least two reflection elements have different numbers of reflection plane.]

[5. The modularized light-guiding apparatus as the claim 4, wherein, it may decide the light-reflection times and light-path lengths provided by the modularized light-guiding apparatus, by choosing different numbers of reflection element and the reflection element having different numbers of reflection plane to adjoin each other to become the modularized light-guiding apparatus.]

[6. The modularized light-guiding apparatus as the claim 1, wherein, each reflection element all is a single element that is formed to one body.]

[7. The modularized light-guiding apparatus as the claim 1, wherein, at least one reflection plane of the reflection element is formed by arranging at least one plane with predetermined angle on the reflection element and covering at least one layer of plating film of light-reflection material on the plane.]

[8. The modularized light-guiding apparatus as the claim 1, wherein, positioning means are further included to position, fix, and connect the plural reflection elements to one body without separating from each other.]

[9. The modularized light-guiding apparatus as the claim 8, wherein, the positioning means further reaches the position and fixture for the plural reflection elements, by arranging a positioning plate individually on each two end sides of the reflection elements, and arranging several positioning convex points on the positioning plate to be able to be inter-set-in with the positioning concave holes arranged at predetermined positions of two end sides of each reflection element, and by the inter-setting-in for the convex points and the concave points to make the reflection element be able to be positioned and connected at some predetermined position on the positioning plate.]

[10. The modularized light-guiding apparatus as the claim 8, wherein, the positioning means reaches the position and fixture for the plural reflection elements, by directly adhering and connecting the adjacent adjoining planes of each adjacent reflection element.]

[11. The modularized light-guiding apparatus as the claim 1, wherein, no matter how many numbers of reflection plane possessed by the reflection element, the direction and position for the light entering into and emitting away each reflection element are all the same.]

[12. A modularized light-guiding apparatus, which may make the light of a light source proceed at least twice light-reflection of predetermined direction, the modularized light-guiding apparatus includes:

plural reflection elements, each reflection element individually has at least one reflection plane provided to proceed reflection for the light, and each reflection element individually all has substantially same edge size and can be inter-piled-up to become the light-guiding apparatus, and only by the inter-piling-up for each reflection element, it is sufficient to reach the inter-position for the plural reflection elements, and facilitate the reflection planes of each reflection element be able to be corresponded with the reflection planes of another reflection element to proceed the light-reflection of predetermined direction.]

[13. The modularized light-guiding apparatus as the claim 12, wherein, in the plural reflection elements, at least one reflection element has at least two reflection planes, and the light of predetermined direction, emitting to the reflection element, can be proceeded more than twice light-reflection by at least two reflection planes, and then the light emits away the reflection element with predetermined direction.]

[14. The modularized light-guiding apparatus as the claim 12, wherein, each reflection element all is a single element that is formed to one body.]

[15. The modularized light-guiding apparatus as the claim 12, wherein, positioning means are further included to position, fix, and connect the plural reflection elements to one body without separating from each other.]

[16. The modularized light-guiding apparatus as the claim 15, wherein, the positioning means further reaches the position and fixture for the plural reflection elements, by arranging a positioning plate individually on each two end sides of the reflection elements, and arranging several positioning convex points on the positioning plate to be able to be inter-set-in with the positioning concave holes arranged at predetermined positions of two end sides of each reflection element, and by the inter-setting-in for the convex points and the concave points to make the reflection element be able to be positioned and connected at some predetermined position on the positioning plate.]

[17. The modularized light-guiding apparatus as the claim 15, wherein, the positioning means reaches the position and fixture for the plural reflection elements, by directly adhering and connecting the adjacent adjoining planes of each adjacent reflection element.]

[18. The modularized light-guiding apparatus as the claim 12, wherein, no matter how many numbers of reflection plane possessed by the reflection element, the direction and position for the light entering into and emitting away each reflection element are all the same.]

[19. A modularized light-guiding apparatus, which may make the light of a light source proceed at least twice light-reflection of predetermined direction, the modularized light-guiding apparatus includes:

plural reflection elements, each reflection element all is a single element formed to one body and each individually has at least a reflection plane provided for proceeding the reflection of the light, and in plural reflection elements, at least one reflection element has at least two reflection planes for making the light proceed at least twice light reflections in the reflection element; and positioning mechanism, which is used to proceed the position for the plural reflection element, and facilitates the reflection plane of each reflection element to be able to be corresponded with the reflection plane of another reflection element to proceed the light reflection of predetermined direction.]

[20. The modularized light-guiding apparatus as the claim 19, wherein, the positioning means further reaches the position and fixture for the plural reflection elements, by arranging a positioning plate individually on each two end sides of the reflection elements, and arranging several positioning convex points on the positioning plate to be able to be inter-set-in with the positioning concave holes arranged at predetermined positions of two end sides of each reflection element, and by the inter-setting-in for the convex points and the concave points to make the reflection element be able to be positioned and connected at some predetermined position on the positioning plate.]

[21. The modularized light-guiding apparatus as the claim 19, wherein, the positioning means reaches the position and fixture for the plural reflection elements, by the design of each reflection element has adjoining planes which have substantially same edge size, and by directly adhering and connecting the adjacent adjoining planes of each adjacent reflection element.]

[22. The modularized light-guiding apparatus as the claim 19, wherein, no matter how many numbers of reflection plane possessed by the reflection element, the direction and position for the light entering into and emitting away each reflection element are all the same.]

[23. A modularized light-guiding apparatus, which may make the light of a light source proceed at least twice light-reflection of predetermined direction, the modularized light-guiding apparatus includes:

plural reflection elements, which can be differentiated to different types of reflection element, and each type's each reflection element all has substantially same adjoining mechanism for providing to be adjoined and piled-up with another reflection element, but the reflection elements of different type individually has different numbers of reflection plane for providing the light to proceed several times of light reflection, wherein it can be decided the reflection times of the light-guiding apparatus, by choosing several different types of reflection elements among the plural reflection elements to proceed piling-up.]

[24. The modularized light-guiding apparatus as the claim 23, wherein, each reflection element all is a single element that is formed to one body.]

[25. The modularized light-guiding apparatus as the claim 23, wherein, a positioning means is further included, and the positioning means reaches the position and fixture for the plural reflection elements, by arranging a positioning plate individually on each two end sides of the reflection elements, and arranging several positioning convex points on the positioning plate to be able to be inter-set-in with the positioning concave holes arranged at predetermined positions of two end sides of each reflection element, and by the inter-setting-in for the convex points and the concave points to make the reflection element be able to be positioned and connected at some predetermined position on the positioning plate.]

[26. The modularized light-guiding apparatus as the claim 23, wherein, the positioning means reaches the position and fixture for the plural reflection elements, by the design of each reflection element has substantially same adjoining planes which have substantially same edge size, and by directly adhering and connecting the adjacent adjoining planes of each adjacent reflection element.]

[27. The modularized light-guiding apparatus as the claim 23, wherein, no matter how many numbers of reflection plane possessed by the reflection element, the direction and position for the light entering into and emitting away each reflection element are all the same.]

[28. A modularized light-guiding apparatus, which may make the light of a light source proceed at least twice light-reflection of predetermined direction, the modularized light-guiding apparatus includes:

plural reflection elements, which can be differentiated to different types of reflection element, and each type's reflection element has individually has different numbers of reflection plane for providing the light to proceed several times of light reflection; and positioning mechanism, which is used to proceed the position for the plural reflection element, and facilitates the reflection plane of each reflection element to be able to be corresponded with the reflection plane of another reflection element to proceed the light reflection of predetermined direction;

wherein, it can be decided the times of light reflection for the light-guiding apparatus, by choosing predetermined number of several reflection elements with different types among the plural reflection elements, and by the positioning mechanism to position and assembly the light-guiding apparatus.]

[29. The modularized light-guiding apparatus as the claim 28, wherein, each reflection element all is a single element that is formed to one body.]

[30. The modularized light-guiding apparatus as the claim 28, wherein, the positioning means reaches the position and fixture for the plural reflection elements, by arranging a positioning plate individually on each two end sides of the reflection elements, and arranging several positioning convex points on the positioning plate to be able to be inter-set-in with the positioning concave holes arranged at predetermined positions of two end sides of each reflection element, and by the inter-setting-in for the convex points and the concave points to make the reflection element be able to be positioned and connected at some predetermined position on the positioning plate.]

[31. The modularized light-guiding apparatus as the claim 28, wherein, the positioning means reaches the position and fixture for the plural reflection elements, by the design of each reflection element has substantially same adjoining planes which have substantially same edge size, and by directly adhering and connecting the adjacent adjoining planes of each adjacent reflection element.]

[32. The modularized light-guiding apparatus as the claim 28, wherein, no matter how many numbers of reflection plane possessed by the reflection element, the direction and position for the light entering into and emitting away each reflection element are all the same.]

[33. A manufacturing method for a modularized light-guiding apparatus includes following steps:

preparing plural reflection elements, which may be differentiate to the reflection element of several different types, and the reflection elements of each different type individually have different numbers of reflection planes for providing light to proceed light-reflection of different times and light-path lengths;

according to the needed values of light-path length for the intended-manufacturing light-guiding apparatus, the needed types and numbers of reflection elements are calculated out to reach the values of the light-path length; and the light-guiding apparatus is assembled and connected according to the calculation for the needed reflection elements.]

[34. The manufacturing method for a modularized light-guiding apparatus as the claim 33, wherein, independent on any type, each reflection element all has substantially same adjoining planes that have substantially same edge sizes, and it may reach the position for the plural reflection elements by directly piling up and adjoining together the adjacent adjoining planes for each adjacent element.]

[35. The manufacturing method for a modularized light-guiding apparatus as the claim 33, wherein, no matter how many numbers of reflection plane possessed by the reflection element, the direction and position for the light entering into and emitting away each reflection element are all the same.]

[36. The manufacturing method for a modularized light-guiding apparatus as the claim 33, wherein, each reflection element all is a single element that is formed to one body.]

*37. An optical apparatus comprising:*

*a light focusing mechanism;*

*a plurality of adjacent reflective planes positioned to reflect light received through an opening before guiding the light out through the opening onto a light path that extends to the light focusing mechanism; and*

*at least one adjoining plane structured to connect to a positioning mechanism and, if connected to the positioning mechanism, fix a position of the adjacent reflective planes relative to another plurality of adjacent reflective planes.*

*38. The optical apparatus of claim 37, wherein the light has a constant direction and position guided onto the light path independently of the number of reflections performed by the adjacent reflective planes.*

*39. The optical apparatus of claim 37, wherein the adjoining plane orients and arranges both of the pluralities of adjacent reflective planes to proceed light-reflection in a predetermined direction along the light path.*

*40. The optical apparatus of claim 37, wherein the adjacent reflective planes have substantially the same edge size.*

*41. An optical apparatus comprising:*

*a light focusing mechanism;*

*a light-guiding module having adjacent reflective regions, the light-guiding module capable of receiving light and reflecting the light using the adjacent reflective regions before sending the light over a light path that extends to the light focusing mechanism; and*

*at least one adjoining plane capable of adjoining the plurality of adjacent reflective regions with another plurality of adjacent reflective regions.*

*42. The optical apparatus of claim 41, wherein the light is sent at a constant direction and position independently of the number of reflections performed by the plurality of adjacent reflective regions.*

*43. The optical apparatus of claim 41, wherein the at least one adjoining plane orients and arranges the pluralities of adjacent reflective regions to guide the light in a predetermined direction.*

*44. The optical apparatus of claim 41, wherein the adjacent reflective regions are planar and have substantially the same edge size.*

*45. An apparatus comprising:*

*means for reflecting light received through an opening of a light guiding module to guide the light back through the opening;*

*means for focusing the light subsequent to the light being guided back through the opening; and*

*means for securing an end of the light guiding module to fix a position of the light guiding module relative to at least one other light guiding module;*

*wherein the light represents a scanned object.*

*46. The apparatus of claim 45 wherein the opening is defined by adjoined reflective regions.*

*47. The apparatus of claim 46 wherein the adjoined reflective regions include only two reflective surfaces and the light is reflected twice using the reflective surfaces.*

*48. The apparatus of claim 45 wherein the means for securing the end of the light guiding module further comprises:*

*means for securing an end of a light source module to fix a position of the light source module relative to the light guiding modules.*

*49. The apparatus of claim 45 wherein the light guiding modules include an equal number of reflective surfaces.*

*50. The apparatus of claim 45 wherein convex points are mated with concave points to secure the end of the light guiding module.*

*51. An apparatus, comprising:*

*a light source configured to illuminate an object to be scanned;*

*a light guiding module configured to receive light representing the object and reflect the light along a light path that extends to a light focusing mechanism, wherein the light guiding module includes at least one end having an attachment structure thereon; and*

*a positioning device including an attachment region configured to mate with the attachment structure on the end of the light guiding module, wherein mating the attachment structure of the end of the light guiding module with the attachment region of the positioning device secures a position of the lighting guiding module relative to the light source.*

*52. The apparatus of claim 51, wherein the positioning device includes at least one additional attachment region configured to mate with an attachment structure on an end of another light guiding module.*

*53. The apparatus of claim 51, wherein the attachment structure comprises at least one concave point.*

*54. The apparatus of claim 53, wherein the attachment region comprises at least one convex point to mate with the concave point.*

*55. The apparatus of claim 51, wherein the light guiding module includes a plurality of reflective surfaces.*

*56. An apparatus, comprising:*

*a light source configured to illuminate an object to be scanned; and*

*a positioning plate including a plurality of attachment regions, wherein each attachment region is configured to releasably connect to an attachment structure on an end of a light guiding module;*

*wherein if any attachment structures of any light guiding module are releasably connected to the attachment region, any such light guiding module is positioned to reflect light originating from the light source.*

*57. The apparatus of claim 56, further comprising a plurality of light guiding modules.*

*58. The apparatus of claim 57, wherein at least one of the light guiding modules includes a different number of reflective surfaces than another one of the light guiding modules.*

*59. The apparatus of claim 56, further comprising a light focusing mechanism to receive and focus light originating from the light source.*

* * * * *

UNITED STATES PATENT AND TRADEMARK OFFICE

CERTIFICATE OF CORRECTION

PATENT NO. : RE41,636 E
APPLICATION NO. : 11/796694
DATED : September 7, 2010
INVENTOR(S) : Fang It is certified that error appears in the above-identified patent and that said Letters Patent is hereby corrected as shown below:

Column 1, lines 9-13, delete "*More than one reissue application has been filed for the reissue of U.S. Pat. No. 6,619,807. The reissue applications are application Ser. No. 11/796,694 (the present divisional reissue application), and Ser. No. 11/229,450, all of which are reissues of U.S. Pat. No. 6,619,807.*" and insert

-- *CROSS REFERENCE TO RELATED APPLICATIONS*

*More than one reissue application has been filed for the reissue of U.S. Pat. No. 6,619,807. The reissue applications are application Ser. No. 11/796,694 (the present divisional reissue application), and Ser. No. 11/229,450, all of which are reissues of U.S. Pat. No. 6,619,807.*

*The present application is a divisional of U.S. Ser. No. 11/229,450 filed Sep. 16, 2005, which in turn is a Reissue of U.S. Ser. No. 10/014,150 filed Dec. 7, 2001, all of which are commonly assigned to the assignee of the present invention.* --.

Signed and Sealed this
Twenty-fifth Day of September, 2012

David J. Kappos

David J. Kappos
*Director of the United States Patent and Trademark Office*